(12) United States Patent
Yuan et al.

(10) Patent No.: US 12,501,301 B2
(45) Date of Patent: Dec. 16, 2025

(54) METHOD AND APPARATUS FOR DETERMINING CHANNEL STATE INFORMATION, METHOD AND APPARATUS FOR DETERMINING REPORTING SETTING, AND RELATED DEVICE

(71) Applicant: VIVO MOBILE COMMUNICATION CO., LTD., Guangdong (CN)

(72) Inventors: Jiangwei Yuan, Guangdong (CN); Yang Song, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 328 days.

(21) Appl. No.: 18/133,861

(22) Filed: Apr. 12, 2023

(65) Prior Publication Data

US 2023/0247467 A1    Aug. 3, 2023

Related U.S. Application Data

(63) Continuation of application No. PCT/CN2021/124832, filed on Oct. 20, 2021.

(30) Foreign Application Priority Data

Oct. 20, 2020    (CN) .......................... 202011126220.0

(51) Int. Cl.
*H04B 7/06* (2006.01)
*H04L 5/00* (2006.01)
*H04W 24/10* (2009.01)

(52) U.S. Cl.
CPC ........... *H04W 24/10* (2013.01); *H04L 5/0051* (2013.01); *H04L 5/0053* (2013.01)

(58) Field of Classification Search
CPC .... H04W 24/10; H04L 5/0051; H04L 5/0053; H04L 5/0057; H04B 7/06968
See application file for complete search history.

(56) References Cited

U.S. PATENT DOCUMENTS

2020/0007299 A1    1/2020  Han et al.
2021/0337549 A1   10/2021  Zhang et al.
(Continued)

FOREIGN PATENT DOCUMENTS

CN    110535515 A    12/2019
CN    111431687 A     7/2020
(Continued)

OTHER PUBLICATIONS

3GPP TSG RAN WG1 Meeting#90, R1-1712228 Title:Codeword to layer mapping in NR (Year: 2017).*
(Continued)

*Primary Examiner* — Christopher M Crutchfield
*Assistant Examiner* — Abusayeed M Haque
(74) *Attorney, Agent, or Firm* — Foley & Lardner LLP

(57) ABSTRACT

A method and apparatus for determining channel state information, a method and apparatus for determining a reporting setting, and a related device, and pertains to the field of communication technologies. The method for determining channel state information includes: determining a first channel state information CSI report, where the first CSI report is determined according to at least one of the following mappings: a mapping between multiple groups of channel measurement resources CMRs and multiple groups of interference measurement resources IMRs; or a mapping between multiple groups of CMRs and one group of IMRs, where each group of CMRs includes one or more CMRs, and each group of IMRs includes one or more IMRs.

20 Claims, 5 Drawing Sheets

(56) References Cited

U.S. PATENT DOCUMENTS

| | | | |
|---|---|---|---|
| 2022/0060266 A1 | 2/2022 | Xiao et al. | |
| 2022/0124740 A1* | 4/2022 | Ji | H04B 7/024 |
| 2022/0190977 A1 | 6/2022 | Lee et al. | |
| 2022/0330276 A1* | 10/2022 | Kim | H04W 72/542 |
| 2022/0385384 A1* | 12/2022 | Jiang | H04B 7/063 |
| 2023/0156502 A1* | 5/2023 | Sun | H04W 8/24 370/252 |
| 2024/0056255 A1* | 2/2024 | Sun | H04W 24/10 |
| 2024/0107354 A1* | 3/2024 | Matsumura | H04B 7/0695 |

FOREIGN PATENT DOCUMENTS

| | | | |
|---|---|---|---|
| JP | 2020511831 A | 4/2020 | |
| WO | 2020034312 A1 | 2/2020 | |
| WO | 2020204322 A1 | 10/2020 | |
| WO | 2020207269 A1 | 10/2020 | |

OTHER PUBLICATIONS

3GPP TSG RAN WG1 Meeting#91, R1-179425 Title: Remaining issues fo rteh CSI reporting (Year: 2017).*

International Search Report and Written Opinion for Application No. PCT/CN2021/124832, dated Jan. 11, 2022, 8 Pages.

Vivo "Discussion on remaining issues on multi beam enhancement" 3GPP TSG RAN WG1 #98bis, Chongqing, China, Oct. 2019, R1-1910230, 9 Pages.

MediaTek Inc., "Enhancements on multi-beam operations" 3GPP TSG RAN WG1 #98bis, Chongqing, China, Oct. 2019, R1-1911047, 10 Pages.

First Office Action for Japanese Application No. 2023-524300, dated May 29, 2024, 10 Pages.

Second Office Action for Japanese Application No. 2023-524300, dated Dec. 12, 2024, 15 Pages.

Huawei, HiSilicon "Enhancements on multi-beam operation" 3GPP TSG RAN WG1 Meeting #98bis, Chongqing, China, Oct. 2019, R1-1910074, 18 Pages.

First Office Action for Korean Application No. 10-2023-7013674, dated Apr. 22, 2025, 14 Pages.

Samsung "Enhancements on multi-beam operations" 3GPP TSG RAN WG1 98bis, Chongqing, China, Oct. 2019, R1-1910494, 6 Pages.

Nokia, Nokia Shanghai Bell "Enhancements on Multi TRP/ Panel Transmission" 3GPP TSG RAN WG1 #99 Meeting, Reno, U.S.A., Nov. 2019, R1-1912719, 14 Pages.

Apple Inc. "Remaining Issues for Multi-TRP Enhancement" 3GPP TSG RAN WG1 #101, e-Meeting, May 2020, R1-2004229, 12 Pages.

Extended European Search Report for Application No. 21882021.5, dated Mar. 6, 2024, 9 Pages.

\* cited by examiner

METHOD AND APPARATUS FOR DETERMINING CHANNEL STATE INFORMATION, METHOD AND APPARATUS FOR DETERMINING REPORTING SETTING, AND RELATED DEVICE

CROSS-REFERENCE TO RELATED APPLICATIONS

This application is a continuation of PCT Application No. PCT/CN2021/124832 filed on Oct. 20, 2021, which claims priority to Chinese Patent Application No. 202011126220.0, filed on Oct. 20, 2020, which are incorporated herein by reference in their entireties.

TECHNICAL FIELD

This application pertains to the field of communications technologies and specifically relates to a method and apparatus for determining channel state information, a method and apparatus for determining a reporting setting, and a related device.

BACKGROUND

Currently, in a case that channel state information (CSI) reporting setting includes multiple channel measurement resources (CMR), a same quantity of interference measurement resources (IMR) need to be included to jointly form a measurement assumption condition, causing relatively large configuration overheads for IMRs.

SUMMARY

According to a first aspect, a method for determining channel state information is provided, including:
  determining a first channel state information CSI report, where
  the first CSI report is determined according to at least one of the following mappings:
  a mapping between multiple groups of channel measurement resources CMRs and multiple groups of interference measurement resources IMRs; or
  a mapping between multiple groups of CMRs and one group of IMRs, where
  each group of CMRs includes one or more CMRs, and each group of IMRs includes one or more IMRs.

According to a second aspect, a method for determining a reporting setting, performed by a network-side device, is provided, including:
  configuring a reporting setting, where the reporting setting includes at least one of the following mappings:
  a mapping between multiple groups of channel measurement resources CMRs and multiple groups of interference measurement resources IMRs; or
  a mapping between multiple groups of CMRs and one group of IMRs, where
  each group of CMRs includes one or more CMRs, and each group of IMRs includes one or more IMRs.

According to a third aspect, an apparatus for determining channel state information, performed by a terminal, is provided, including:
  a determining module, configured to determine a first channel state information CSI report, where
  the first CSI report is determined according to at least one of the following mappings:
  a mapping between multiple groups of channel measurement resources CMRs and multiple groups of interference measurement resources IMRs; or
  a mapping between multiple groups of CMRs and one group of IMRs, where
  each group of CMRs includes one or more CMRs, and each group of IMRs includes one or more IMRs.

According to a fourth aspect, an apparatus for determining a reporting setting, performed by a network-side device, is provided, including:
  a configuration module, configured to configure a reporting setting, where the reporting setting includes at least one of the following mappings:
  a mapping between multiple groups of channel measurement resources CMRs and multiple groups of interference measurement resources IMRs; or
  a mapping between multiple groups of CMRs and one group of IMRs, where
  each group of CMRs includes one or more CMRs, and each group of IMRs includes one or more IMRs.

According to a fifth aspect, a terminal is provided, including a processor, a memory, and a program or instructions stored in the memory and capable of running on the processor, and when the program or instructions are executed by the processor, the steps of the method for determining channel state information according to the first aspect are implemented.

According to a sixth aspect, a network-side device is provided, where the network device includes a processor, a memory, and a program or instructions stored in the memory and capable of running on the processor, and when the program or instructions are executed by the processor, the steps of the method for determining a reporting setting according to the second aspect are implemented.

According to a seventh aspect, a readable storage medium is provided, where the readable storage medium stores a program or instructions, and when the program or instructions are executed by a processor, the steps of the method for determining channel state information according to the first aspect are implemented; or when the program or instructions are executed by a processor, the steps of the method for determining a reporting setting according to the second aspect are implemented.

According to an eighth aspect, a chip is provided, where the chip includes a processor and a communications interface, the communications interface is coupled to the processor, and the processor is configured to run a program or instructions on a network-side device to implement the method for determining channel state information according to the first aspect, or implement the method for determining a reporting setting according to the second aspect.

According to a ninth aspect, a computer program product is provided, where the program product is stored in a non-transitory storage medium, and the program product is executed by at least one processor to implement the method according to the first aspect or implement the method according to the second aspect.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that the data used in such a way is interchangeable in appropriate circumstances so that the embodiments of this application can be implemented in other orders than the order illustrated or described herein. Moreover, the objects distinguished by "first" and "second" are usually of one type, and the number of objects is not limited. For example, the first object may be one or more than one. In addition, "and/or" in the specification and claims represents at least one of connected objects, and the character "/" generally indicates that the associated objects have an "or" relationship.

It should be noted that the technology described in embodiments of this application is not limited to a long term evolution (LTE)/LTE-advanced (LTE-A) system, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably. The described technology may be used in the foregoing systems and radio technologies as well as other systems and radio technologies. However, in the following descriptions, a new radio (NR) system is described for an illustration purpose, and NR terms are used in most of the following descriptions, although these technologies may also be applied to other applications than an NR system application, for example, the $6^{th}$ generation (6G) communications system.

Figure 1:
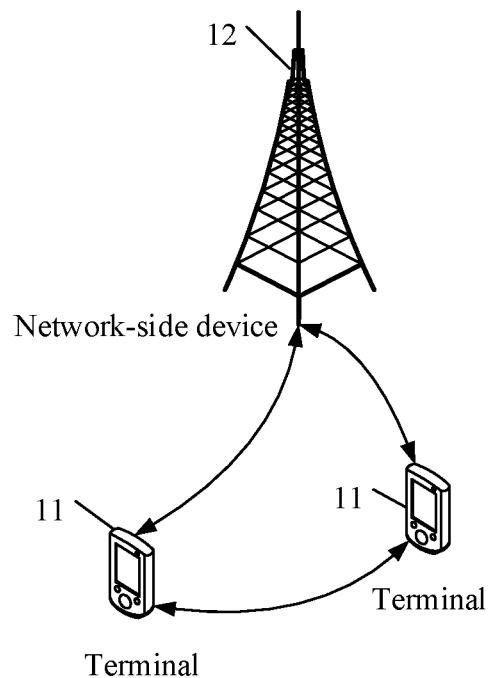
FIG. 1 is a structural diagram of a network system according to an embodiment of this application.

FIG. 1 is a block diagram of a wireless communications system applicable to an embodiment of this application. The wireless communications system includes a terminal 11 and a network-side device 12. The terminal 11 may also be referred to as a terminal device or user equipment. The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, an in-vehicle device (VUE), or a pedestrian terminal (PUE). The wearable device includes a wrist band, earphones, glasses, and the like. It should be noted that a specific type of the terminal 11 is not limited in the embodiments of this application. The network-side device 12 may be a base station or a core network. The base station may be referred to as a node B, an evolved Node B, an access point, a base transceiver station (BTS), a radio base station, a basic service set (BSS), an extended service set (ESS), a NodeB, an evolved B node (eNB), a home NodeB, a home evolved NodeB, a WLAN access point, a Wi-Fi node, a transmission-reception point (Transmitting Receiving Point, TRP), or another suitable term in the field. Provided that a same technical effect is achieved, the base station is not limited to a specific technical term. It should be noted that in the embodiments of this application, only a base station in an NR system is used as an example, but a specific type of the base station is not limited.

The following describes in detail a method for determining channel state information provided in the embodiments of this application by using specific embodiments and application scenarios thereof with reference to the accompanying drawings.

Figure 2:
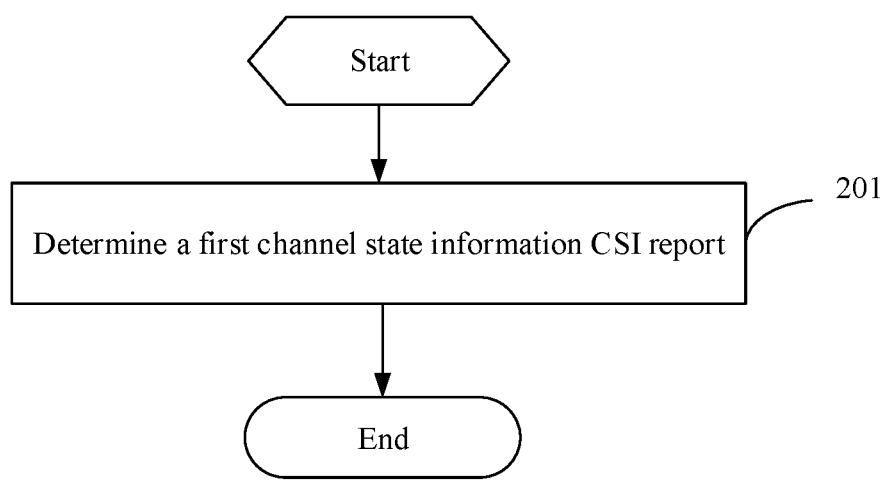
FIG. 2 is a flowchart of a method for determining channel state information according to an embodiment of this application.

Refer to FIG. 2. FIG. 2 is a flowchart of a method for determining channel state information according to an embodiment of this application. The method for determining channel state information is performed by a terminal and includes the following steps.

Step 201: Determine a first channel state information (CSI) report based on at least one of the following mappings:

a mapping between multiple groups of channel measurement resources (CMR) and multiple groups of interference measurement resources (IMR); or a mapping between multiple groups of CMRs and one group of IMRs, where each group of CMRs includes one or more CMRs, and each group of IMRs includes one or more IMRs. One group of CMRs corresponds to one TRP, one group of CMRs corresponds to one target CSI report, and a first CSI report includes multiple target CSI reports.

The first CSI report may be a beam-related CSI report or may be a multi-transmission reception point (MTRP) related CSI report.

In this embodiment, the first CSI report is determined according to a mapping between multiple groups of CMRs and multiple groups of IMRs and/or a mapping between multiple groups of CMRs and one group of IMRs, and the IMRs may not be in a one-to-one mapping with the CMRs, that is, the number of the IMRs may be less than the number of the CMRs, so as to reduce the configuration overheads for IMRs.

In the foregoing descriptions, in a case that the first CSI report corresponds to one CSI reporting setting, if multiple CMRs are mapped to one IMR, the first CSI report is further determined according to multiple pieces of quasi co-location QCL information or multiple transmission configuration indicator TCI states of the IMR.

Descriptions like "if xxxx, then yyyy" in the embodiments of this application can be understood as "in a case of xxxx, yyyy is performed". For example, the foregoing description "in a case that the first CSI report corresponds to one CSI reporting setting, if multiple CMRs are mapped to one IMR, the first CSI report is further determined according to multiple pieces of quasi co-location QCL information or multiple transmission configuration indicator TCI states of the IMR" may be understood as "in a case that the first CSI report corresponds to one CSI reporting setting and that multiple CMRs are mapped to one IMR, the first CSI report is further determined according to multiple pieces of quasi co-location QCL information or multiple transmission configuration indicator TCI states of the IMR".

In a mapping from multiple groups of CMRs to multiple groups of IMRs or from multiple CMRs to one group of IMRs, if multiple CMRs are mapped to one IMR, the first CSI report is further determined according to multiple pieces of quasi co-location (QCL) information or multiple transmission configuration indicator (TCI) states of the IMR.

The QCL information or the TCI states include one or more of QCLtypeA, QCLtypeB, QCLtypeC, and QCLtypeD.

In the foregoing descriptions, the mapping between multiple groups of CMRs and multiple groups of IMRs includes:

a one-to-one mapping between the multiple groups of CMRs and the multiple groups of IMRs, where for a first group of CMRs and a first group of IMRs that are mapped, CMRs in the first group of CMRs are in a one-to-one mapping to IMRs in the first group of IMRs, or multiple CMRs in the first group of CMRs are mapped to one IMR in the first group of IMRs, where the first group of CMRs is one of the multiple groups of CMRs, and the first group of IMRs is one of the multiple groups of IMRs.

In other words, for one group of CMRs and one group of IMRs that are mapped, the CMRs and IMRs in the groups can be mapped in a one-to-one manner, that is, the CMRs in the first group of CMRs are in a one-to-one mapping with the IMRs in the first group of IMRs; or the CMRs and IMRs in the groups can be mapped in a multiple-to-one manner, that is, the multiple CMRs in the first group of CMRs are mapped to one IMR in the first group of IMRs. Preferably, the one-to-one mapping between multiple groups of CMRs and multiple groups of IMRs can be applied to the case that the first CSI report corresponds to one CSI reporting setting.

The mapping manners between groups may be the same or different. For example, group A1 and group A2 are both CMR groups, group B1 and group B2 are both IMR groups, group A1 is mapped to group B1, and group A2 is mapped to group B2. For group A1 and group B1, the CMRs and IMRs in the groups may be mapped in a one-to-one or multiple-to-one manner; and for group A2 and group B2, the CMRs and IMRs in the groups may be mapped in a one-to-one or multiple-to-one manner.

In the foregoing descriptions, if the CMRs in the first group of CMRs are in a one-to-one mapping with the IMRs in the first group of IMRs, QCL information of the IMR in the first group of IMRs is the same as QCL information of the corresponding mapped-to CMRs, or a TCI state of the IMR in the first group of IMRs is the same as a TCI state of the corresponding mapped-to CMR. The IMR is a non-zero power channel state information-reference signal (Non-Zero Power Channel State Information-Reference Signal, NZP CSI-RS) IMR, or a channel state information interference measurement (CSI-IM) IMR.

In the foregoing descriptions, the mapping between multiple groups of CMRs and one group of IMRs includes:

a mapping from multiple groups of CMRs to a second group of IMRs, where for a second group of CMRs and the second group of IMRs that are mapped, CMRs in the second group of CMRs are in a one-to-one mapping to IMRs in the second group of IMRs, or multiple CMRs in the second group of CMRs are mapped to one IMR in the second group of IMRs, where the second group of CMRs is one of the multiple groups of CMRs.

In other words, multiple groups of CMRs are mapped to the same group of IMRs. For one group of CMRs and multiple groups of IMRs that are mapped, the CMRs and IMRs in the groups can be mapped in a one-to-one manner, that is, the CMRs in the second group of CMRs are in a one-to-one mapping with the IMRs in the second group of IMRs; or the CMRs and IMRs in the groups can be mapped in a multiple-to-one manner, that is, multiple CMRs in the second group of CMRs are mapped to one IMR in the second group of IMRs. Preferably, the mapping from multiple groups of CMRs to the second group of IMRs can be applied to the case that the first CSI report corresponds to one CSI reporting setting.

The mapping manners between groups may be the same or different. For example, group A1 and group A2 are both CMR groups, group B1 is an IMR group, group A1 is mapped to group B1, and group A2 is mapped to group B1. For group A1 and group B1, the CMRs and IMRs in the groups may be mapped in a one-to-one or multiple-to-one manner; and for group A2 and group B1, the CMRs and IMRs in the groups may be mapped in a one-to-one or multiple-to-one manner.

In an embodiment of this application, the mapping between multiple groups of CMRs and one group of IMRs includes:

a mapping from multiple groups of CMRs to a third group of IMRs; where if CMRs in each group of CMRs are in a one-to-one mapping to IMRs in the third group of IMRs, the IMRs in the third group of IMRs have multiple pieces of QCL information or multiple TCI states, where one of the multiple pieces of QCL information is the same as QCL information of one CMR in each group of CMRs, and different QCL information of the IMR corresponds to different CMRs; and one of the multiple TCI states is the same as a TCI state of one CMR in each group of CMRs, and different TCI states of the IMR correspond to different CMRs. The IMRs in the third group of IMR may be CSI-IM IMRs. Preferably, the mapping between multiple groups of CMRs and the third group of IMRs can be applied to the case that the first CSI report corresponds to one CSI reporting setting.

For example, group A1 and group A2 are both CMR groups, group B1 is an IMR group, and group A1 and group A2 are both mapped to group B1, where group A1 includes CMR1 and CMR2, group A2 includes CMR3 and CMR4, and group B1 includes IMR1 and IMR2. CMR1 and CMR3 are both mapped to IMR1, and CMR2 and CMR4 are both mapped to IMR2.

IMR1 and IMR2 both have multiple pieces of QCL information or multiple TCI states. First QCL information in the multiple pieces of QCL information in IMR2 is the same as the QCL information in CMR1, and second QCL information in the multiple pieces of QCL information in IMR2 is the same as the QCL information in CMR2, where the first QCL information and the second QCL information are different QCL information in the multiple pieces of QCL information in IMR2.

In other words, in a case that the first CSI report corresponds to one CSI reporting setting, the first CSI report can be determined according to the following mapping: multiple CMR groups are mapped to one CSI-IM IMR group, the CMRs in each CMR group are in a one-to-one mapping with the IMRs in the IMR group, that is, multiple CMRs from different CMR groups are mapped to the same IMR, and the IMR has multiple pieces of QCL information or TCI states, where each piece of QCL information or each TCI state is the same as a piece of QCL information or a TCI state of a corresponding CMR, and different QCL information or TCI states of the IMR corresponds to different CMRs.

In an embodiment of this application, in a case that the first CSI report corresponds to one CSI reporting setting, the first CSI report includes at least one of the following report parameters:

CRI, PMI, RI, CQI, RSRP, SINR, LI, I1, and SSBRI;
the report parameters are determined according to at least one of the following manners:
being determined according to RRC configuration;
being determined based on a quantity of control resource set pool indexes in PDCCH configuration or based on the quantity of control resource set pool indexes and index values of the control resource set pool indexes;
being determined based on newly added content related to a report quantity in CSI report configuration; or
being determined based on a newly added field indicating a report quantity in CSI report configuration.

In the foregoing description, the channel state information resource indicator (CRI), precoding matrix indicator (PMI), rank indicator (RI), channel quality indicator (CQI), reference signal received power (RSRP), signal to interference noise ratio (SINR), layer indicator (LI), composite codebook index (I1), and synchronization signal block resource indicator (SSBRI) may be provided in one or more.

The report parameters can be determined according to the radio resource control (RRC) signaling configuration or configured through a higher layer parameter, physical downlink control channel (PDCCH) configuration (PDCCH-Config). The report parameters may alternatively be determined based on newly added content related to a report quantity in CSI report configuration or determined based on a newly added field indicating a report quantity in CSI report configuration.

Specifically, the report parameters can be determined based on the values and quantity of control resource set pool index values (CORESETPoolIndex) in the higher layer parameter PDCCH configuration (that is, PDCCH-Config).

In a case that the report parameters are determined according to the PDCCH configuration, if the PDCCH configuration includes one control resource set pool index or the PDCCH configuration includes no control resource set pool index, the report parameters included in the target CSI report are the same or different in quantity. For example, if the PDCCH configuration includes one CORESETPoolIndex or no CORESETPoolIndex, one CSI report may include 1 CRI, 1 CQI, 1 RI, and 2 PMIs, or include 2 CRIs, 1 CQI, 2 RIs, and 2 PMIs.

Alternatively, if the PDCCH configuration includes multiple control resource set pool indexes, and index values of the control resource set pool indexes are different, each of the report parameters included in the target CSI report has a same quantity as the control resource set pool indexes, or each of the report parameters included in the target CSI report has a same quantity as TRPs. For example, if the PDCCH configuration includes two or more CORESETPoolIndexes with different values, one CSI report may include 2 CRIs, 2 PMIs, 2 RIs, and 2 CQIs.

The reporting setting is determined based on newly added content related to a report quantity in CSI report configuration. For example, a higher layer parameter (that is, reportQuantity) may be added in the CSI report configuration (that is, CSI-ReportConfig) to add some special content to support MTRP CSI, for example, 1 CRI, 1 CQI, 1 RI, and 2 PMIs; 2 CRIs, 1 CQI, 2 RIs, and 2 PMIs; or 2 CRIs, 2 CQIs, 2 RIs, and 2 PMIs.

The report parameters are determined based on a newly added field indicating a report quantity in CSI report configuration. For example, a new field may be added to the CSI report configuration (CSI-ReportConfig) to support MTRP CSI quantity selection. For example, a Quantity-mtrp field is added to support multiple configurations, for example, 1 CRI, 1 CQI, 1 RI, and 2 PMIs; or 2 CRIs, 1 CQI, 2 RIs, and 2 PMIs; or 2 CRIs, 2 CQIs, 2 RIs, and 2 PMIs.

In the foregoing descriptions, each report parameter can be provided in two or more, so as to better support MTRP transmission.

In an embodiment of this application, in a case that N CMRs are mapped to one IMR, if no measurement occasion for interference measurement resources is present between the N CMRs, the IMR corresponding to the N CMRs is determined by mapping interference measurement resources on the latest N measurement occasions to the N CMRs according to a first preset rule, where N is an integer greater than 1;
or
in a case that N CMRs are mapped to one IMR, if measurement occasions for interference measurement resources are present between the N CMRs, an IMR corresponding to a first CMR in the N CMRs is an interference measurement resource on the latest measurement occasion mapped by no other CMRs before the first CMR, and an IMR corresponding to an n-th CMR in the N CMRs is an interference measurement resource on the latest measurement occasion mapped by no other CMRs before the n-th CMR, where n is an integer greater than 1 and less than or equal to N, an (n−1)-th CMR comes earlier than the n-th CMR, and the N CMRs are mapped to the measurement occasions in an order from an N-th CMR to the first CMR. That is, in a case of determining the IMR corresponding to the N CMRs, an IMR corresponding to the latest CMR is first determined, and then IMRs corresponding to all other CMRs are determined in an order of presence of the CMRs, from the latest to the earliest.

In the foregoing descriptions, the first preset rule is: IMRs corresponding to the N CMRs are in one-to-one mapping to interference measurement resources on the latest N measurement occasions.

For example, in a case that two CMRs are mapped to a same IMR, if no measurement occasion for interference measurement resources is present between the two CMRs, the IMR corresponding to the two CMRs is determined by mapping channel measurement resources on the latest two measurement occasions to the two CMRs according to a specified rule.

The first preset rule may be: The IMR is determined according to an order of presence of the two CMRs. That is, the IMR corresponding to the first CMR is the first measurement occasion of the latest two measurement occasions, and the IMR corresponding to the second CMR is the second measurement occasion of the latest two measurement occasions. Alternatively, the IMR corresponding to the first CMR is the second measurement occasion of the latest two measurement occasions, and the IMR corresponding to the second CMR is the first measurement occasion of the latest two measurement occasions. This can be flexibly set based on an actual situation and is not limited herein.

If measurement occasions for interference measurement resources are present between the two CMRs, a measurement occasion of an IMR corresponding to the first CMR is the IMR on the latest measurement occasion before the first CMR, and an measurement occasion of the IMR corresponding to the second CMR is the latest measurement occasion between the two CMRs.

In a case that the first CSI report corresponds to one CSI reporting setting, the multiple pieces of QCL information of the IMR are used in one of the following ways: using one piece of QCL information on one measurement occasion or using multiple pieces of QCL information on one measurement occasion.

The multiple pieces of QCL information of the IMR are used in one of the following ways: using one piece of QCL information on one measurement occasion; or using multiple pieces of QCL information on one measurement occasion, where each piece of QCL information may correspond to different UE antenna panels or antenna ports.

In an embodiment of this application, in a case that M CMRs are mapped to one IMR, if no measurement occasion for interference measurement resources is present between the M CMRs, QCL information corresponding to the M CMRs is determined by mapping interference measurement resources on the latest M measurement occasions to the M CMRs according to a second preset rule, where M is an integer greater than 1;

or in a case that M CMRs are mapped to one IMR, if measurement occasions for interference measurement resources are present between the M CMRs, QCL information of an IMR corresponding to a first CMR in the M CMRs is determined based on an interference measurement resource on the latest measurement occasion mapped by no other CMRs before the first CMR, and QCL information of an IMR corresponding to an m-th CMR in the M CMRs is determined based on an interference measurement resource on the latest measurement occasion mapped by no other CMRs before the m-th CMR, where m is an integer greater than 1 and less than or equal to M, an (m−1)-th CMR comes earlier than the m-th CMR, and the M CMRs are mapped to the measurement occasions in an order from an M-th CMR to the first CMR. That is, in a case of determining the IMR corresponding to the M CMRs, an IMR corresponding to the latest CMR is first determined, and then IMRs corresponding to all other CMRs are determined in an order of presence of the CMRs, from the latest to the earliest.

The second preset rule is: IMRs corresponding to the M CMRs are in one-to-one mapping with interference measurement resources on the latest M measurement occasions.

For example, in a case that two CMRs are mapped to a same IMR, if no measurement occasion for interference measurement resources is present between the two CMRs, QCL information of the IMR corresponding to the N CMRs can be determined by mapping channel measurement resources on the latest two measurement occasions to the two CMRs according to a specified rule.

The second preset rule may be: The IMR is determined according to an order of presence of the two CMRs. That is, the IMR corresponding to the first CMR is the first measurement occasion of the latest two measurement occasions, and the IMR corresponding to the second CMR is the second measurement occasion of the latest two measurement occasions. Alternatively, the IMR corresponding to the first CMR is the second measurement occasion of the latest two measurement occasions, and the IMR corresponding to the second CMR is the first measurement occasion of the latest two measurement occasions. This can be flexibly set based on an actual situation and is not limited herein.

If measurement occasions for interference measurement resources are present between the two CMRs, a measurement occasion of an IMR corresponding to the first CMR is the IMR on the latest measurement occasion before the first CMR, and an measurement occasion of the IMR corresponding to the second CMR is the latest measurement occasion between the two CMRs.

In an embodiment of this application, after the determining a first channel state information CSI report, the method further includes:

sending a second CSI report, where
the second CSI report includes a first target CSI report and a second target CSI report, the first target CSI report is a target CSI report that is unselected in multiple target CSI reports in the first CSI report, and the second target CSI report is a target CSI report that is selected in the multiple target CSI reports.

This embodiment can be applied to a case that the first CSI report corresponds to one CSI reporting setting or a case that the first CSI report corresponds to multiple CSI reporting settings.

One target CSI report corresponds to one TRP, and the terminal can select, according to the target CSI report, a TRP that the terminal expects to schedule the terminal. If the terminal does not expect that a TRP schedules the terminal based on a CSI or does not expect that a TRP schedules the terminal, the terminal can set a CQI index value of the corresponding CSI or a target CSI of the corresponding TRP to 0 when generating the target CSI report (details are provided in the following descriptions). After the network-side device decodes the target CSI report, if the CQI index value corresponding to the target CSI is 0, it indicates that the terminal does not expect the network-side device to perform scheduling according to the CSI or does not expect to participate in scheduling by a TRP corresponding to the target CSI.

The first target CSI report is a target CSI report corresponding to a TRP that the terminal does not expect to select, and the second target CSI report is a target CSI report corresponding to a TRP that the terminal expects to select. The second CSI report may include only part of the first target CSI report, for example, content of a first part (part1). The second CSI report may include a first part of the second target CSI report and all other parts of the second target CSI report apart from the first part. For example, if the second target CSI report includes a first part (part1) and a second part (part2), the second CSI report may include the first part and second part of the second target CSI report. In other words, the second CSI report may include the first part of the first target CSI report and/or all parts of the second target CSI report.

In the foregoing descriptions, being selected or unselected can be indicated according to the first part of the target CSI report. That is, in a case that the first part of the first target CSI report includes at least one of the following, it indicates that the TRP corresponding to the first target CSI report is not selected and the terminal does not expect the network-side device to schedule the TRP:

a CQI index value being 0 or a first specified value;
an RI index value being 0 or a second specified value; or
a CSI state indicated by a bitmap being a first state.

In a case that the first part of the second target CSI report includes at least one of the following, it indicates that the TRP corresponding to the second target CSI report is selected and the terminal expects the network-side device to schedule the TRP:

- a CQI index value being not 0 or not a first specified value;
- an RI index value being not 0 or not a second specified value;
- a CRI; or
- a CSI state indicated by a bitmap being a second state.

Specifically, if the CQI index value (index) in the first part is 0 (that is, OOR) or a first specified value, it indicates that the terminal has not selected the current target CSI, that is, the terminal does not expect to participate in scheduling by a TRP corresponding to that target CSI or does not expect the network-side device to perform scheduling according to the CSI with a CQI index value being 0, and if the CQI index value is 0, and that target CSI includes two or more parts, the terminal does not report any part other than part1; and if the CQI index value (index) in the first part is not 0 (that is, OOR) or not the first specified value, it indicates that the terminal selects the current target CSI, that is, the terminal expects to participate in scheduling by a TRP corresponding to that target CSI or expects the network-side device to perform scheduling according to the CSI with a CSI index value being not 0, and if the CQI index value is 0, and the target CSI includes two or more parts, the terminal reports other parts in addition to part1.

If the RI in the first part is 0 or a second specified value, it indicates that the terminal has not selected the current target CSI, that is, the terminal does not expect to participate in scheduling by a TRP corresponding to that target CSI or does not expect the network-side device to perform scheduling according to the CSI with an RI being 0, and if that target CSI includes two or more parts, the terminal does not report any part other than part1; and if the RI in the first part is not 0 or not the second specified value, it indicates that the terminal selects the current target CSI, that is, the terminal expects to participate in scheduling by a TRP corresponding to that target CSI or expects the network-side device to perform scheduling according to the CSI with an RI being not 0, and if that target CSI includes two or more parts, the terminal reports other parts in addition to part1;

- if one or more CRIs are reported in the first part, it indicates that the terminal selects a CSI corresponding to the current one or more CRIs, and if a CSI unselected includes two or more parts, the terminal does not report any part other than part1; and
- a CSI state in the current report is explicitly indicated in part1 through bitmap mapping, and if a bit corresponding to the target CSI is invalid, for example, being 0 or in a first state, it indicates that the terminal does not select that target CSI, that is, the terminal does not expect to participate in scheduling by a TRP corresponding to the CSI corresponding to the bit being 0, or does not expect the network-side device to perform scheduling according to the CSI corresponding to the bit being 0. In addition, if the target CSI corresponding to the bit being 0 includes two or more parts, the terminal does not report any part other than part1.

If the bit (bit) corresponding to the target CSI is valid, for example, being 1 or in a second state, it indicates that the terminal has selected that target CSI, that is, the terminal expects to participate in scheduling by a TRP corresponding to the CSI corresponding to the bit being 1, or expects the network-side device to perform scheduling according to the CSI corresponding to the bit being 1. In addition, if the target CSI corresponding to the bit being 1 includes two or more parts, the terminal reports other parts in addition to part1.

In an embodiment of this application, in a case that the first CSI report corresponds to multiple CSI reporting settings, after the determining a first channel state information CSI report, the method further includes:

sending a third CSI report for multiple times, where the third CSI report is determined based on a first target CSI report and a second target CSI report;

or sending a joint CSI report, where the joint CSI report includes report parameters corresponding to the second target CSI report, where the first target CSI report is a target CSI report that is unselected in multiple target CSI reports in the first CSI report, and the second target CSI report is a target CSI report that is selected in the multiple target CSI reports.

Specifically, the third CSI report is sent for multiple times, and the third CSI report sent each time may be a same or different CSI report. The third CSI report may include part of the first target CSI report and all parts of the second target CSI report.

Report parameters included in the third CSI report can be determined based on the report parameters in the second target CSI report. In each CSI reporting setting, a different quantity of report parameters can be configured. For example, in a case that 2 PMIs, 2 RIs, and 1 CQI being reported for multiple times is determined according to the second target CSI report, if two third CSI reports are used to report 2 PMIs, 2 RIs, and 1 CQI to two TRPs, a CSI reporting setting corresponding to the 1st third CSI report can be configured to 1 PMI, 1 RI, and 1 CQI, and a CSI reporting setting corresponding to the 2nd third CSI report can be configured to 1 PMI and 1 RI; CQI in the second third CSI report is from the 1st third CSI report; and the two third CSI report can be reported on different resources.

Alternatively, a joint CSI report can be reported at one time, where the joint CSI report may include multiple PMIs, CQIs, and Ms that correspond to multiple CSI reporting settings. For example, if 2 PMIs, 2 RIs, and 1 CQI need to be reported to two TRPs through two target CSI reports, the 2 PMIs, 2 RIs, and 1 CQI can be reported on report resources corresponding to the CSI reporting setting of the 1st second target CSI report or the 2nd second target report.

In the foregoing descriptions, the joint CSI may include only the second target CSI report or may include the first target CSI report and the second target CSI report. For example, the joint CSI report may include the first part of the first target CSI report and/or all parts of the second target CSI report.

In the foregoing descriptions, if the multiple target CSI reports correspond to different PUCCH resources or PUSCH resources, the third CSI report is sent for multiple times;

if the multiple target CSI reports correspond to a same PUCCH resource or PUSCH resource, the joint CSI report is sent.

In other words, the terminal can determine, based on the physical uplink control channel (PUCCH) or the physical uplink shared channel (PUSCH), whether to report multiple target CSI reports separately or report one joint CSI report. For example, if multiple CSI reporting settings correspond to a same PUCCH resource or PUSCH resource, one joint CSI report is reported; and if the multiple CSI reporting settings correspond to different PUCCH resources or PUSCH resources, the multiple target CSI reports are reported based on the respective resources.

In this application, a target CSI report is used to indicate to a network-side device that a terminal does not expect scheduling by a TRP corresponding to a target CSI. In addition, this application can better support reporting of two or more report parameters in different MTRP transmission modes (such as S-DCI and M-DCI), for example, reporting of 2 CRIs, 1 CQI, 2 RIs, 2 PMIs, and the like. Feedback such as selection or deselection is indicated in a first part of the target CSI report, which can reduce feedback overheads and complexity of system scheduling.

Figure 3:
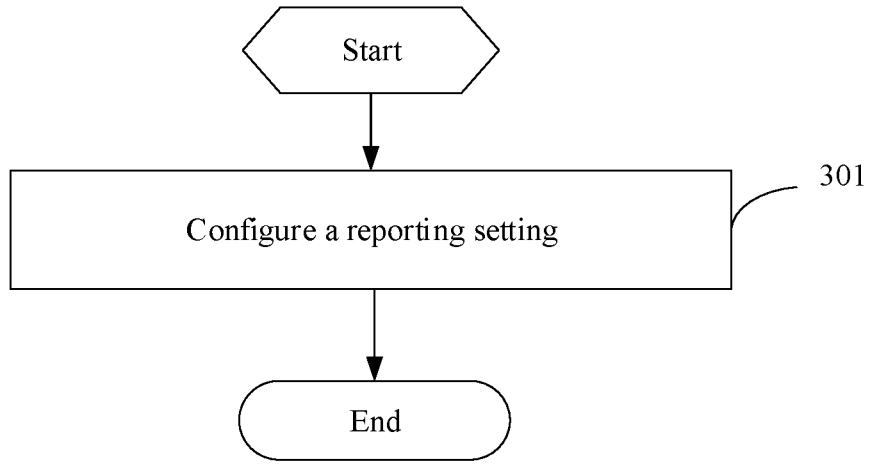
FIG. 3 is a flowchart of a method for determining a reporting setting according to an embodiment of this application.

Refer to FIG. 3. FIG. 3 is a flowchart of a method for determining a reporting setting according to an embodiment of this application. The method for determining a reporting setting is performed by a network-side device and includes the following steps.

Step 301: Configure a reporting setting, where the reporting setting includes at least one of the following mappings:

a mapping between multiple groups of channel measurement resources CMRs and multiple groups of interference measurement resources IMRs; or a mapping between multiple groups of CMRs and one group of IMRs, where each group of CMRs includes one or more CMRs, and each group of IMRs includes one or more IMRs.

In this embodiment, the reporting setting includes a mapping between multiple groups of CMRs and multiple groups of IMRs and/or a mapping between multiple groups of CMRs and one group of IMRs, and the IMRs may be not in a one-to-one mapping with the CMRs, that is, a quantity of the IMRs may be less than a quantity of the CMRs, so as to reduce the configuration overheads for IMRs.

In the foregoing descriptions, each of the multiple groups of CMRs corresponds to one transmission-reception point TRP or one transmission configuration indicator TCI state, and the multiple groups of CMRs have a same shift or different shifts.

In an embodiment of this application, the method for determining a reporting setting further includes:

receiving a CSI report, where the CSI report includes a first target CSI report unselected by a terminal and/or a second target CSI report selected by the terminal.

Further, after the receiving a CSI report, the method further includes:

skipping scheduling a TRP corresponding to the first target CSI report;

and/or scheduling a TRP corresponding to the first target CSI report.

In the foregoing descriptions, a first part of the first target CSI report includes at least one of the following:

a channel quality indicator CQI index value being 0 or a first specified value;

a rank indicator RI index value being 0 or a second specified value; or a CSI state indicated by a bitmap being a first state.

In the foregoing descriptions, a first part of the second target CSI report includes at least one of the following:

a channel quality indicator CQI index value being not 0 or not a first specified value;

a rank indicator RI index value being not 0 or not a second specified value;

a channel state information resource indicator CRI; or a CSI state indicated by a bitmap being a second state.

Specifically, if the CQI index value (index) in the first part is 0 (that is, OOR) or a first specified value, it indicates that the terminal has not selected the current target CSI, that is, the terminal does not expect to participate in scheduling by a TRP corresponding to that target CSI or does not expect the network-side device to perform scheduling according to the CSI with a CQI index value being 0, and if the CQI index value is 0, and that target CSI includes two or more parts, the terminal does not report any part other than part1; and if the CQI index value (index) in the first part is not 0 (that is, OOR) or not the first specified value, it indicates that the terminal selects the current target CSI, that is, the terminal expects to participate in scheduling by a TRP corresponding to that target CSI or expects the network-side device to perform scheduling according to the CSI with a CSI index value being not 0, and if the CQI index value is not 0, and the target CSI includes two or more parts (part), the terminal reports other parts in addition to part1.

If the RI in the first part is 0 or a second specified value, it indicates that the terminal has not selected the current target CSI, that is, the terminal does not expect to participate in scheduling by a TRP corresponding to that target CSI or does not expect the network-side device to perform scheduling according to the CSI with an RI being 0, and if that target CSI includes two or more parts, the terminal does not report any part other than part1; and if the RI in the first part is not 0 or not the second specified value, it indicates that the terminal selects the current target CSI, that is, the terminal expects to participate in scheduling by a TRP corresponding to that target CSI or expects the network-side device to perform scheduling according to the CSI with an RI being not 0, and if that target CSI includes two or more parts, the terminal reports other parts in addition to part1;

if one or more CRIs are reported in the first part, it indicates that the terminal selects a CSI corresponding to the current one or more CRIs, and if a CSI unselected includes two or more parts, the terminal does not report any part other than part1; and a CSI state in the current report is explicitly indicated in part1 through bitmap mapping, and if a bit corresponding to the target CSI is invalid, for example, being 0 or in a first state, it indicates that the terminal does not select that target CSI, that is, the terminal does not expect to participate in scheduling by a TRP corresponding to the CSI corresponding to the bit being 0, or does not expect the network-side device to perform scheduling according to the CSI corresponding to the bit being 0. In addition, if the target CSI corresponding to the bit being 0 includes two or more parts, the terminal does not report any part other than part1.

If the bit corresponding to the target CSI is valid, for example, being 1 or in a second state, it indicates that the terminal has selected that target CSI, that is, the terminal expects to participate in scheduling by a TRP corresponding to the CSI corresponding to the bit being 1, or expects the network-side device to perform scheduling according to the CSI corresponding to the bit being 1. In addition, if the target CSI corresponding to the bit being 1 includes two or more parts, the terminal reports other parts in addition to part1.

It should be noted that the method for determining channel state information provided in the embodiments of this application may be performed by an apparatus for determining channel state information or a control module for performing the method for determining channel state information in the apparatus for determining channel state information.

The method for determining a reporting setting provided in the embodiments of this application may be performed by an apparatus for determining a reporting setting or a control module for performing the method for determining a reporting setting in the apparatus for determining a reporting setting.

In the following embodiments, the method for determining channel state information being performed by the apparatus for determining channel state information is taken as an example to illustrate the apparatus for determining channel state information provided in some embodiments of this application; and the method for determining channel state information being performed by the apparatus for determining channel state information is taken as an example to illustrate the apparatus for determining channel state information provided in some embodiments of this application.

Figure 4:
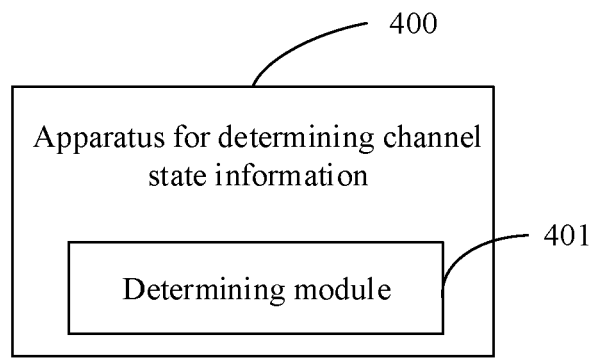
FIG. 4 is a structural diagram of an apparatus for determining channel state information according to an embodiment of this application.

Refer to FIG. 4. FIG. 4 is a structural diagram of an apparatus for determining channel state information according to an embodiment of this application. The apparatus 400 for determining channel state information, performed by a terminal, includes:

a determining module 401, configured to determine a first channel state information CSI report according to at least one of the following mappings:

a mapping between multiple groups of channel measurement resources CMRs and multiple groups of interference measurement resources IMRs; or a mapping between multiple groups of CMRs and one group of IMRs, where each group of CMRs includes one or more CMRs, and each group of IMRs includes one or more IMRs.

Further, in a case that the first CSI report corresponds to one CSI reporting setting, if multiple CMRs are mapped to one IMR, the first CSI report is further determined according to multiple pieces of quasi co-location QCL information or multiple transmission configuration indicator TCI states of the IMR.

Further, in a case that the first CSI report corresponds to one CSI reporting setting, the first CSI report includes at least one of the following report parameters:

channel state information resource indicator CRI, precoding matrix indicator PMI, rank indicator RI, channel quality indicator CQI, reference signal received power RSRP, signal to interference noise ratio SINR, layer indicator LI, composite codebook index I1, and SSB resource indicator SSBRI;

the report parameters are determined according to at least one of the following manners:

being determined based on radio resource control RRC configuration;

being determined based on a quantity of control resource set pool indexes in physical downlink control channel PDCCH configuration or based on the quantity of control resource set pool indexes and index values of the control resource set pool indexes;

being determined based on newly added content related to a report quantity in CSI report configuration; or being determined based on a newly added field indicating a report quantity in CSI report configuration.

Further, if the PDCCH configuration includes one control resource set pool index, or the PDCCH configuration includes no control resource set pool index, the parameters included in the target CSI report are the same or different in quantity;

or if the PDCCH configuration includes multiple control resource set pool indexes, and index values of the control resource set pool indexes are different, each of the report parameters included in a target CSI report has a same quantity as the control resource set pool indexes, or each of the report parameters included in a target CSI report has a same quantity as transmission-reception points TRPs.

Further, the mapping between multiple groups of CMRs and multiple groups of IMRs includes:

a one-to-one mapping between the multiple groups of CMRs and the multiple groups of IMRs, where for a first group of CMRs and a first group of IMRs that are mapped, CMRs in the first group of CMRs are in a one-to-one mapping to IMRs in the first group of IMRs, or multiple CMRs in the first group of CMRs are mapped to one IMR in the first group of IMRs, where the first group of CMRs is one of the multiple groups of CMRs, and the first group of IMRs is one of the multiple groups of IMRs.

Further, if the CMRs in the first group of CMRs are in a one-to-one mapping to IMRs in the first group of IMRs, QCL information of an IMR in the first group of IMRs is the same as QCL information of a mapped CMR, or a TCI state of an IMR in the first group of IMRs is the same as a TCI state of a mapped CMR.

Further, the IMR is a non-zero power channel state information reference signal NZP CSI-RS IMR or a channel state information interference measurement CSI-IM IMR.

Further, the mapping between multiple groups of CMRs and one group of IMRs includes:

a mapping from multiple groups of CMRs to a second group of IMRs, where for a second group of CMRs and the second group of IMRs that are mapped, CMRs in the second group of CMRs are in a one-to-one mapping to IMRs in the second group of IMRs, or multiple CMRs in the second group of CMRs are mapped to one IMR in the second group of IMRs, where the second group of CMRs is one of the multiple groups of CMRs.

Further, the mapping between multiple groups of CMRs and one group of IMRs includes:

a mapping from multiple groups of CMRs to a third group of IMRs; where if CMRs in each group of CMRs are in a one-to-one mapping to IMRs in the third group of IMRs, the IMRs in the third group of IMRs have multiple pieces of QCL information or multiple TCI states, where one of the multiple pieces of QCL information is the same as QCL information of one CMR in each group of CMRs, and different QCL information of IMRs corresponds to different CMRs; and one of the multiple TCI states is the same as a TCI state of one CMR in each group of CMRs, and different TCI states of IMRs correspond to different CMRs.

Further, in a case that N CMRs are mapped to one IMR, if no measurement occasion for interference measurement resources is present between the N CMRs, the IMR corresponding to the N CMRs is determined by mapping interference measurement resources on the latest N measurement occasions to the N CMRs according to a first preset rule, where N is an integer greater than 1;

or in a case that N CMRs are mapped to one IMR, if measurement occasions for interference measurement resources are present between the N CMRs, an IMR corresponding to a first CMR in the N CMRs is an interference measurement resource on the latest measurement occasion mapped by no other CMRs before the first CMR, and an IMR corresponding to an n-th CMR in the N CMRs is an interference measurement resource on the latest measurement occasion mapped by no other CMRs before the n-th CMR, where n is an integer greater than 1 and less than or equal to N, an (n−1)-th CMR comes earlier than the n-th CMR, and the N CMRs are mapped to the measurement occasions in an order from an N-th CMR to the first CMR.

Further, the first preset rule is: IMRs corresponding to the N CMRs are in a one-to-one mapping to interference measurement resources on the latest N measurement occasions.

Further, the multiple pieces of QCL information of the IMR are used in one of the following ways: using one piece of QCL information on one measurement occasion or using multiple pieces of QCL information on one measurement occasion.

Further, in a case that M CMRs are mapped to one IMR, if no measurement occasion for interference measurement resources is present between the M CMRs, QCL information corresponding to the M CMRs is determined by mapping interference measurement resources on the latest M measurement occasions to the M CMRs according to a second preset rule, where M is an integer greater than 1;

or in a case that M CMRs are mapped to one IMR, if measurement occasions for interference measurement resources are present between the M CMRs, QCL information of an IMR corresponding to a first CMR in the M CMRs is determined based on an interference measurement resource on the latest measurement occasion mapped by no other CMRs before the first CMR, and QCL information of an IMR corresponding to an m-th CMR in the M CMRs is determined based on an interference measurement resource on the latest measurement occasion mapped by no other CMRs before the m-th CMR, where m is an integer greater than 1 and less than or equal to M, an (m−1)-th CMR comes earlier than the m-th CMR, and the M CMRs are mapped to the measurement occasions in an order from an M-th CMR to the first CMR.

Further, the apparatus further includes:
a first sending module, configured to send a second CSI report; where
the second CSI report includes a first target CSI report and a second target CSI report, the first target CSI report is a target CSI report that is unselected in multiple target CSI reports in the first CSI report, and the second target CSI report is a target CSI report that is selected in the multiple target CSI reports.

Further, a first part of the first target CSI report includes at least one of the following:
a CQI index value being 0 or a first specified value;
an RI index value being 0 or a second specified value; or
a CSI state indicated by a bitmap being a first state.

Further, a first part of the second target CSI report includes at least one of the following:
a CQI index value being not 0 or not a first specified value;
an RI index value being not 0 or not a second specified value;
a CRI; or
a CSI state indicated by a bitmap being a second state.

Further, the second CSI report may include the first part of the first target CSI report and/or all parts of the second target CSI report.

Further, the apparatus further includes:
a second sending module, configured to send a third CSI report for multiple times, where the third CSI report is determined based on a first target CSI report and a second target CSI report;

or a third sending module, configured to send a joint CSI report, where the joint CSI report includes report parameters corresponding to the second target CSI report, where
the first target CSI report is a target CSI report that is unselected in multiple target CSI reports in the first CSI report, and the second target CSI report is a target CSI report that is selected in the multiple target CSI reports.

Further, if the multiple target CSI reports correspond to different PUCCH resources or PUSCH resources, the third CSI report is sent for multiple times; and if the multiple target CSI reports correspond to a same PUCCH resource or PUSCH resource, the joint CSI report is sent.

The apparatus 400 for determining channel state information in this embodiment of this application may be an apparatus or may be a component, an integrated circuit, or a chip in the terminal.

The apparatus 400 for determining channel state information in this embodiment of this application may be an apparatus having an operating system. The operating system may be an Android operating system, may be an iOS operating system, or may be another possible operating system. This is not specifically limited in this embodiment of this application.

The apparatus 400 for determining channel state information provided in this embodiment of this application can implement the processes implemented by the method embodiment in FIG. 2, with the same technical effects achieved. To avoid repetition, details are not described herein again.

Figure 5:
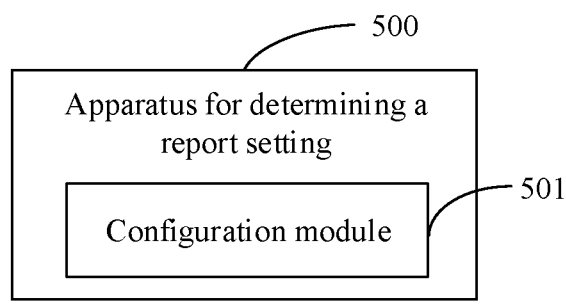
FIG. 5 is a structural diagram of an apparatus for determining a reporting setting according to an embodiment of this application.

Refer to FIG. 5. FIG. 5 is a structural diagram of an apparatus for determining a reporting setting according to an embodiment of this application. The apparatus 500 for determining a reporting setting, performed by a network-side device, includes:
a configuration module 501, configured to configure a reporting setting, where the reporting setting includes at least one of the following mappings:
a mapping between multiple groups of channel measurement resources CMRs and multiple groups of interference measurement resources IMRs; or
a mapping between multiple groups of CMRs and one group of IMRs, where
each group of CMRs includes one or more CMRs, and each group of IMRs includes one or more IMRs.

Further, each of the multiple groups of CMRs corresponds to one transmission-reception point TRP or one transmission configuration indicator TCI state, and the multiple groups of CMRs have a same shift or different shifts.

Further, the apparatus further includes:
a receiving module, configured to receive a CSI report, where the CSI report includes a first target CSI report unselected by a terminal and/or a second target CSI report selected by the terminal.

Further, the apparatus further includes:
a non-scheduling module, configured to skip scheduling a TRP corresponding to the first target CSI report;
and/or
a scheduling module, configured to schedule the TRP corresponding to the first target CSI report.

Further, a first part of the first target CSI report includes at least one of the following:
a channel quality indicator CQI index value being 0 or a first specified value;

a rank indicator RI index value being 0 or a second specified value; or a CSI state indicated by a bitmap being a first state.

Further, a first part of the second target CSI report includes at least one of the following:

a channel quality indicator CQI index value being not 0 or not a first specified value;

a rank indicator RI index value being not 0 or not a second specified value;

a channel state information resource indicator CRI; or a CSI state indicated by a bitmap being a second state.

The apparatus 500 for determining a reporting setting provided in this embodiment of this application can implement the processes implemented by the method embodiment in FIG. 3, with the same technical effects achieved. To avoid repetition, details are not described herein again.

Figure 6:
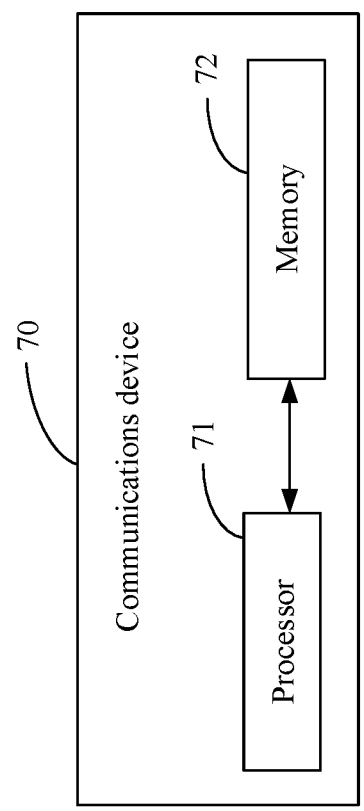
FIG. 6 is a structural diagram of a communications device according to an embodiment of this application.

Optionally, as shown in FIG. 6, an embodiment of this application further provides a communications device 70 including a processor 71, a memory 72, and a program or instructions stored in the memory 72 and capable of running on the processor 71. For example, in a case that the communications device 70 is a terminal, when the program or instructions are executed by the processor 71, the processes of the foregoing embodiment of the method for determining channel state information in FIG. 2 are implemented, with the same technical effects achieved. In a case that the communications device 70 is a network-side device, when the program or instructions are executed by the processor 71, the processes of the embodiment of the method for determining a reporting setting in FIG. 3 are implemented, with the same technical effects achieved. To avoid repetition, details are not described herein again.

Figure 7:
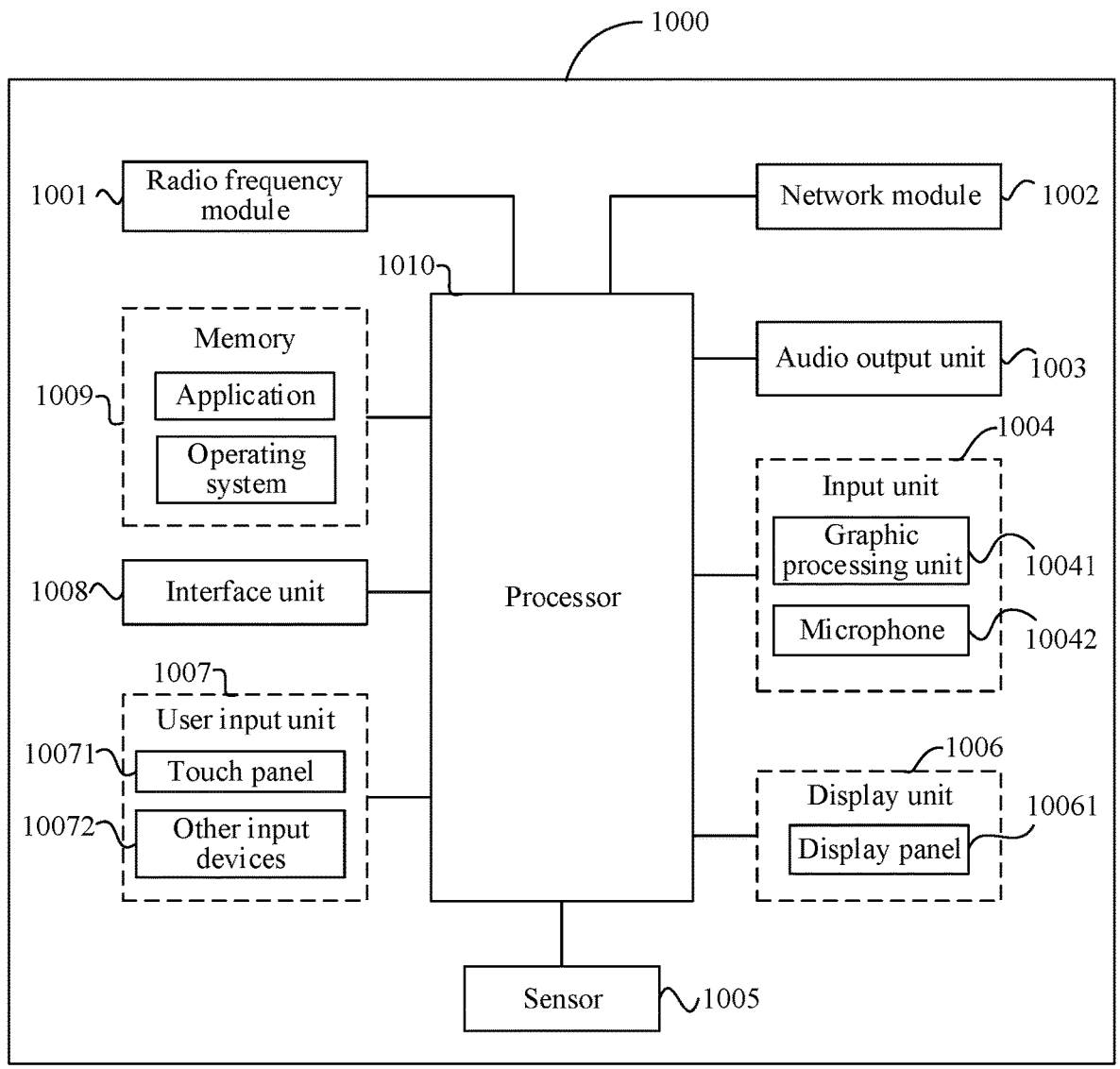
FIG. 7 is a structural diagram of a terminal according to an embodiment of this application.

FIG. 7 is a schematic diagram of a hardware structure of a terminal for implementing embodiments of this application.

The terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

Persons skilled in the art may understand that the terminal 1000 may further include the power supply (for example, a battery) that supplies power to each component. Optionally, the power supply may be logically connected to the processor 1010 by using a power management system, so as to implement functions such as charging management, discharging management, and power consumption management by using the power management system. The structure of the terminal shown in FIG. 7 does not constitute a limitation on the terminal, and the terminal may include more or fewer components than shown in the diagram, or a combination of some components, or the components disposed differently. Details are not described herein again.

It should be understood that in this embodiment of this application, the input unit 1004 may include a graphics processing unit (GPU) 10041 and a microphone 10042. The graphics processing unit 10041 processes image data of a static picture or a video that is obtained by an image capture apparatus (for example, a camera) in a video capture mode or an image capture mode. The display unit 1006 may include a display panel 10061, and the display panel 10061 may be configured in a form of a liquid crystal display, an organic light emitting diode, or the like. The user input unit 1007 includes a touch panel 10071 and other input devices 10072. The touch panel 10071 is also referred to as a touchscreen. The touch panel 10071 may include two parts: a touch detection apparatus and a touch controller. The other input devices 10072 may include but are not limited to a physical keyboard, a function key (such as a volume control key or a power on/off key), a trackball, a mouse, a joystick, and the like. Details are not described herein.

In this embodiment of this application, the radio frequency unit 1001 receives downlink data from a network-side device and then transmits the downlink data to the processor 1010 for processing; and transmits uplink data to the base station. Generally, the radio frequency unit 1001 includes but is not limited to an antenna, at least one amplifier, a transceiver, a coupler, a low noise amplifier, a duplexer, and the like.

The memory 1009 may be configured to store software programs or instructions and various data. The memory 1009 may include a program or instruction storage area and a data storage area. The program or instruction storage area may store an operating system, an application program, or instructions required by at least one function (for example, a sound playback function or an image playback function), and the like. In addition, the memory 1009 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. For example, at least one magnetic disk storage device, a flash memory, or another non-volatile solid-state storage device.

The processor 1010 may include one or more processing units. Optionally, the processor 1010 may integrate an application processor and a modem processor. The application processor mainly processes an operating system, a user interface, an application program or instructions, and the like. The modem processor mainly processes wireless communication, such as a baseband processor. It should be understood that alternatively, the modem processor may not be integrated into the processor 1010.

The processor 1010 is configured to determine a first channel state information CSI report according to at least one of the following mappings:

a mapping between multiple groups of channel measurement resources CMRs and multiple groups of interference measurement resources IMRs; or a mapping between multiple groups of CMRs and one group of IMRs, where each group of CMRs includes one or more CMRs, and each group of IMRs includes one or more IMRs.

Further, in a case that the first CSI report corresponds to one CSI reporting setting, if multiple CMRs are mapped to one IMR, the first CSI report is further determined according to multiple pieces of quasi co-location QCL information or multiple transmission configuration indicator TCI states of the IMR.

Further, in a case that the first CSI report corresponds to one CSI reporting setting, the first CSI report includes at least one of the following report parameters:

channel state information resource indicator CRI, precoding matrix indicator PMI, rank indicator RI, channel quality indicator CQI, reference signal received power RSRP, signal to interference noise ratio SINR, layer indicator LI, composite codebook index I1, and SSB resource indicator SSBRI;

the report parameters are determined according to at least one of the following manners:

being determined based on radio resource control RRC configuration;

being determined based on a quantity of control resource set pool indexes in physical downlink control channel PDCCH configuration or based on the quantity of control resource set pool indexes and index values of the control resource set pool indexes;

being determined based on newly added content related to a report quantity in CSI report configuration; or being determined based on a newly added field indicating a report quantity in CSI report configuration.

Further, if the PDCCH configuration includes one control resource set pool index, or the PDCCH configuration includes no control resource set pool index, the parameters included in the target CSI report are the same or different in quantity;

or if the PDCCH configuration includes multiple control resource set pool indexes, and index values of the control resource set pool indexes are different, each of the report parameters included in the target CSI report has a same quantity as the control resource set pool indexes, or each of the report parameters included in the target CSI report has a same quantity as transmission-reception points TRPs.

Further, the mapping between multiple groups of CMRs and multiple groups of IMRs includes:

a one-to-one mapping between the multiple groups of CMRs and the multiple groups of IMRs, where for a first group of CMRs and a first group of IMRs that are mapped, CMRs in the first group of CMRs are in a one-to-one mapping to IMRs in the first group of IMRs, or multiple CMRs in the first group of CMRs are mapped to one IMR in the first group of IMRs, where the first group of CMRs is one of the multiple groups of CMRs, and the first group of IMRs is one of the multiple groups of IMRs.

Further, if the CMRs in the first group of CMRs are in a one-to-one mapping to IMRs in the first group of IMRs, QCL information of an IMR in the first group of IMRs is the same as QCL information of a mapped CMR, or a TCI state of an IMR in the first group of IMRs is the same as a TCI state of a mapped CMR.

Further, the IMR is a non-zero power channel state information reference signal NZP CSI-RS IMR or a channel state information interference measurement CSI-IM IMR.

Further, the mapping between multiple groups of CMRs and one group of IMRs includes:

a mapping from multiple groups of CMRs to a second group of IMRs, where for a second group of CMRs and the second group of IMRs that are mapped, CMRs in the second group of CMRs are in a one-to-one mapping to IMRs in the second group of IMRs, or multiple CMRs in the second group of CMRs are mapped to one IMR in the second group of IMRs, where the second group of CMRs is one of the multiple groups of CMRs.

Further, the mapping between multiple groups of CMRs and one group of IMRs includes:

a mapping from multiple groups of CMRs to a third group of IMRs; where if CMRs in each group of CMRs are in a one-to-one mapping to IMRs in the third group of IMRs, the IMRs in the third group of IMRs have multiple pieces of QCL information or multiple TCI states, where one of the multiple pieces of QCL information is the same as QCL information of one CMR in each group of CMRs, and different QCL information of IMRs corresponds to different CMRs; and one of the multiple TCI states is the same as a TCI state of one CMR in each group of CMRs, and different TCI states of IMRs correspond to different CMRs.

Further, in a case that N CMRs are mapped to one IMR, if no measurement occasion for interference measurement resources is present between the N CMRs, the IMR corresponding to the N CMRs is determined by mapping interference measurement resources on the latest N measurement occasions to the N CMRs according to a first preset rule, where N is an integer greater than 1;

or in a case that N CMRs are mapped to one IMR, if measurement occasions for interference measurement resources are present between the N CMRs, an IMR corresponding to a first CMR in the N CMRs is an interference measurement resource on the latest measurement occasion mapped by no other CMRs before the first CMR, and an IMR corresponding to an n-th CMR in the N CMRs is an interference measurement resource on the latest measurement occasion mapped by no other CMRs before the n-th CMR, where n is an integer greater than 1 and less than or equal to N, an (n−1)-th CMR comes earlier than the n-th CMR, and the N CMRs are mapped to the measurement occasions in an order from an N-th CMR to the first CMR.

Further, the first preset rule is: IMRs corresponding to the N CMRs are in a one-to-one mapping to interference measurement resources on the latest N measurement occasions.

Further, the multiple pieces of QCL information of the IMR are used in one of the following ways: using one piece of QCL information on one measurement occasion or using multiple pieces of QCL information on one measurement occasion.

Further, in a case that M CMRs are mapped to one IMR, if no measurement occasion for interference measurement resources is present between the M CMRs, QCL information corresponding to the M CMRs is determined by mapping interference measurement resources on the latest M measurement occasions to the M CMRs according to a second preset rule, where M is an integer greater than 1;

or in a case that M CMRs are mapped to one IMR, if measurement occasions for interference measurement resources are present between the M CMRs, QCL information of an IMR corresponding to a first CMR in the M CMRs is determined based on an interference measurement resource on the latest measurement occasion mapped by no other CMRs before the first CMR, and QCL information of an IMR corresponding to an m-th CMR in the M CMRs is determined based on an interference measurement resource on the latest measurement occasion mapped by no other CMRs before the m-th CMR, where m is an integer greater than 1 and less than or equal to M, an (m−1)-th CMR comes earlier than the m-th CMR, and the M CMRs are mapped to the measurement occasions in an order from an M-th CMR to the first CMR.

Further, the radio frequency unit 1001 is configured to send a second CSI report; where the second CSI report includes a first target CSI report and a second target CSI report, the first target CSI report is a target CSI report that is unselected in multiple target CSI reports in the first CSI report, and the second target CSI report is a target CSI report that is selected in the multiple target CSI reports.

Further, a first part of the first target CSI report includes at least one of the following:

a CQI index value being 0 or a first specified value;

an RI index value being 0 or a second specified value; or a CSI state indicated by a bitmap being a first state.

Further, a first part of the second target CSI report includes at least one of the following:

a CQI index value being not 0 or not a first specified value;

an RI index value being not 0 or not a second specified value;

a CRI; or a CSI state indicated by a bitmap being a second state.

Further, the second CSI report may include the first part of the first target CSI report and/or all parts of the second target CSI report.

Further, in a case that the first CSI report corresponds to multiple CSI reporting settings, the radio frequency unit 1001 is configured to:

send a third CSI report for multiple times, where the third CSI report is determined based on a first target CSI report and a second target CSI report;

or send a joint CSI report, where the joint CSI report includes report parameters corresponding to the second target CSI report, where the first target CSI report is a target CSI report that is unselected in multiple target CSI reports in the first CSI report, and the second target CSI report is a target CSI report that is selected in the multiple target CSI reports.

Further, if the multiple target CSI reports correspond to different PUCCH resources or PUSCH resources, the third CSI report is sent for multiple times; and if the multiple target CSI reports correspond to a same PUCCH resource or PUSCH resource, the joint CSI report is sent.

The terminal 1000 provided in the embodiment can implement the processes implemented in the method embodiment of FIG. 2 with the same technical effects achieved. To avoid repetition, details are not described herein again.

Figure 8:
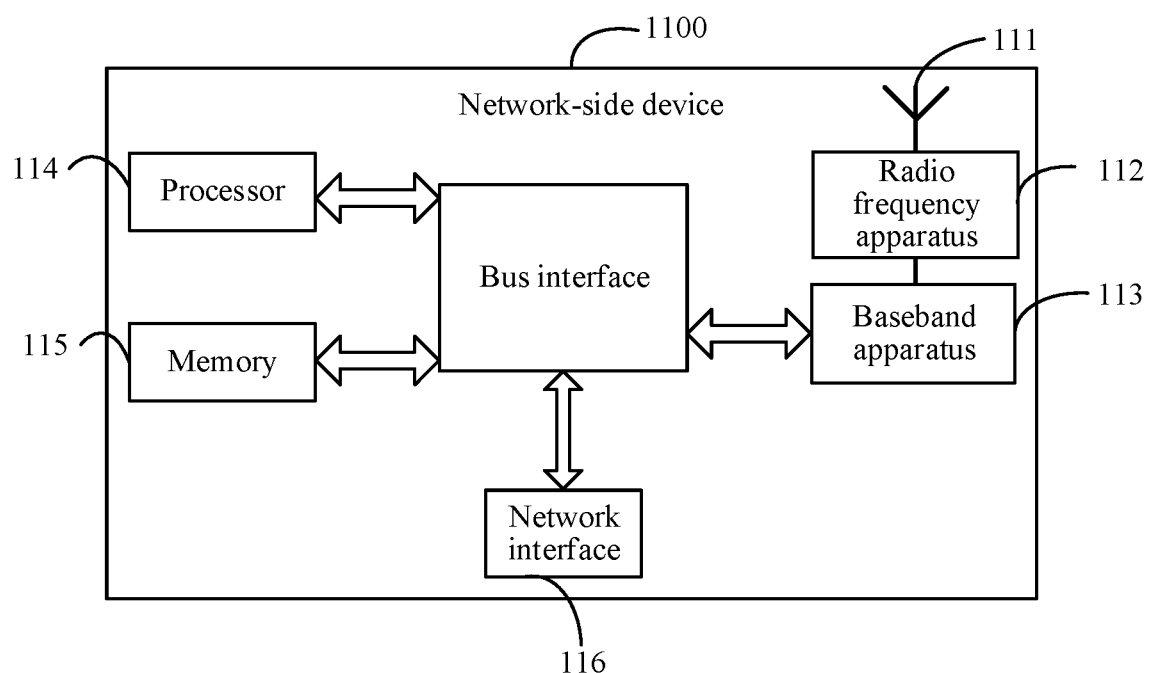
FIG. 8 is a structural diagram of a network-side device according to an embodiment of this application.

Specifically, an embodiment of this application further provides a network-side device. As shown in FIG. 8, the network-side device 1100 includes an antenna 111, a radio frequency apparatus 112, and a baseband apparatus 113. The antenna 111 is connected to the radio frequency apparatus 112. In an uplink direction, the radio frequency apparatus 112 receives information by using the antenna 111 and transmits the received information to the baseband apparatus 113 for processing. In a downlink direction, the baseband apparatus 113 processes to-be-transmitted information, and transmits the information to the radio frequency apparatus 112; and the radio frequency apparatus 112 processes the received information and then transmits the information by using the antenna 111.

The frequency band processing apparatus may be located in the baseband apparatus 113. The method performed by the network-side device in the foregoing embodiment may be implemented by the baseband apparatus 113, and the baseband apparatus 113 includes a processor 114 and a memory 115.

The baseband apparatus 113 may include, for example, at least one baseband processing unit, where a plurality of chips are disposed on the baseband processing unit. As shown in FIG. 8, one of the chips is, for example, the processor 114, connected to the memory 115, to invoke a program in the memory 115 to perform the network operation shown in the foregoing method embodiment.

The baseband apparatus 113 may further include a network interface 116, configured to exchange information with the radio frequency apparatus 112, where the interface is, for example, a common public radio interface (CPRI).

Specifically, the network-side device in this embodiment of the present invention further includes instructions or a program stored in the memory 115 and capable of running on the processor 114. The processor 114 invokes the instructions or program in the memory 115 to perform the method executed by the modules shown in FIG. 5, with the same technical effect achieved. To avoid repetition, details are not described herein again.

An embodiment of this application further provides a readable storage medium. The readable storage medium stores a program or instructions. When the program or instructions are executed by a processor, the processes of the method embodiment shown in FIG. 2 or FIG. 3 are implemented, with the same technical effects achieved. To avoid repetition, details are not described herein again.

The processor is a processor in the terminal or the network-side device described in the foregoing embodiments. The readable storage medium includes a computer-readable storage medium such as a computer read-only memory (ROM), a random access memory (RAM), a magnetic disk, or an optical disc.

An embodiment of this application further provides a chip. The chip includes a processor and a communications interface. The communications interface is coupled to the processor. The processor is configured to run a program or instructions for a network-side device, to implement the processes of the method embodiments shown in FIG. 2 and FIG. 3, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application further provides a computer program product, where the computer program product is stored in a non-transient storage medium and is executed by at least one processor to implement the processes of the embodiments in FIG. 2 and FIG. 3, with the same technical effects achieved. To avoid repetition, details are not repeated herein.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network, or the like) to perform the methods described in the embodiments of this application.

Persons of ordinary skill in the art may realize that units and algorithm steps of various examples described with reference to the embodiments disclosed in this specification can be implemented by using electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be another division in actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this disclosure. The foregoing storage medium includes any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer-readable storage medium. When the program runs, the processes of the method embodiments may be included. The storage medium may include a magnetic disk, an optical disc, a read-only memory (ROM), or a random access memory (RAM).

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A method for determining channel state information, performed by a terminal, comprising:
   determining a first channel state information CSI report according to at least one of the following mappings:
   a mapping between multiple groups of channel measurement resources CMRs and multiple groups of interference measurement resources IMRs; or
   a mapping between multiple groups of CMRs and one group of IMRs, wherein
   each group of CMRs comprises one or more CMRs, and each group of IMRs comprises one or more IMRs.

2. The method according to claim 1, wherein in a case that the first CSI report corresponds to one CSI reporting setting and multiple CMRs are mapped to one IMR, the first CSI report is further determined based on multiple pieces of quasi co-location QCL information or multiple transmission configuration indicator TCI states of the IMR.

3. The method according to claim 1, wherein in a case that the first CSI report corresponds to one CSI reporting setting, report parameters comprised in the first CSI report are determined according to at least one of the following manners:
   being determined based on radio resource control RRC configuration;
   being determined based on a quantity of control resource set pool indexes in physical downlink control channel PDCCH configuration or based on the quantity of control resource set pool indexes and index values of the control resource set pool indexes;
   being determined based on newly added content related to a report quantity in CSI report configuration; or
   being determined based on a newly added field indicating a report quantity in CSI report configuration.

4. The method according to claim 3, wherein in a case that the PDCCH configuration comprises one control resource set pool index, or in a case that the PDCCH configuration comprises no control resource set pool index, the report parameters comprised in a target CSI report are the same or different in quantity;
or
in a case that the PDCCH configuration comprises multiple control resource set pool indexes and index values of the control resource set pool indexes are different, each of the report parameters comprised in a target CSI report has a same quantity as the control resource set pool indexes, or each of the report parameters comprised in a target CSI report has a same quantity as transmission-reception points TRPs.

5. The method according to claim 1, wherein the mapping between multiple groups of CMRs and multiple groups of IMRs comprises:
a one-to-one mapping between the multiple groups of CMRs and the multiple groups of IMRs, wherein
for a first group of CMRs and a first group of IMRs that are mapped, CMRs in the first group of CMRs are in a one-to-one mapping to IMRs in the first group of IMRs, or multiple CMRs in the first group of CMRs are mapped to one IMR in the first group of IMRs, wherein the first group of CMRs is one of the multiple groups of CMRs, and the first group of IMRs is one of the multiple groups of IMRs;
and/or,
wherein the mapping between multiple groups of CMRs and one group of IMRs comprises:
a mapping from multiple groups of CMRs to a second group of IMRs, wherein
for a second group of CMRs and the second group of IMRs that are mapped, CMRs in the second group of CMRs are in a one-to-one mapping to IMRs in the second group of IMRs, or multiple CMRs in the second group of CMRs are mapped to one IMR in the second group of IMRs, wherein the second group of CMRs is one of the multiple groups of CMRs;
and/or,
wherein the mapping between multiple groups of CMRs and one group of IMRs comprises:
a mapping from multiple groups of CMRs to a third group of IMRs; wherein
in a case that CMRs in each group of CMRs are in a one-to-one mapping to IMRs in the third group of IMRs, the IMRs in the third group of IMRs have multiple pieces of QCL information or multiple TCI states, wherein
one of the multiple pieces of QCL information is the same as QCL information of one CMR in each group of CMRs, and different QCL information of IMRs corresponds to different CMRs; and
one of the multiple TCI states is the same as a TCI state of one CMR in each group of CMRs, and different TCI states of IMRs correspond to different CMRs.

6. The method according to claim 5, wherein in a case that CMRs in the first group of CMRs are in a one-to-one mapping to IMRs in the first group of IMRs, QCL information of an IMR in the first group of IMRs is the same as QCL information of a mapped CMR, or a TCI state of an IMR in the first group of IMRs is the same as a TCI state of a mapped CMR.

7. The method according to claim 6, wherein the IMR is a non-zero power channel state information reference signal NZP CSI-RS IMR or a channel state information interference measurement CSI-IM IMR.

8. The method according to claim 1, wherein in a case that N CMRs are mapped to one IMR and no measurement occasion for interference measurement resources is present between the N CMRs, the IMR corresponding to the N CMRs is determined by mapping interference measurement resources on the latest N measurement occasions to the N CMRs according to a first preset rule, wherein N is an integer greater than 1;
or
in a case that N CMRs are mapped to one IMR and measurement occasions for interference measurement resources are present between the N CMRs, an IMR corresponding to a first CMR in the N CMRs is an interference measurement resource on the latest measurement occasion mapped by no other CMRs before the first CMR, and an IMR corresponding to an n-th CMR in the N CMRs is an interference measurement resource on the latest measurement occasion mapped by no other CMRs before the n-th CMR, wherein n is an integer greater than 1 and less than or equal to N, an (n−1)-th CMR comes earlier than the n-th CMR, and the N CMRs are mapped to the measurement occasions in an order from an N-th CMR to the first CMR;
or,
in a case that M CMRs are mapped to one IMR and no measurement occasion for interference measurement resources is present between the M CMRs, QCL information of the IMR corresponding to the M CMRs is determined by mapping interference measurement resources on the latest M measurement occasions to the M CMRs according to a second preset rule, wherein M is an integer greater than 1;
or
in a case that M CMRs are mapped to one IMR and measurement occasions for interference measurement resources are present between the M CMRs, QCL information of an IMR corresponding to a first CMR in the M CMRs is determined based on an interference measurement resource on the latest measurement occasion mapped by no other CMRs before the first CMR, and QCL information of an IMR corresponding to an m-th CMR in the M CMRs is determined based on an interference measurement resource on the latest measurement occasion mapped by no other CMRs before the m-th CMR, wherein m is an integer greater than 1 and less than or equal to M, the (m−1)-th CMR comes earlier than the m-th CMR, and the M CMRs are mapped to the measurement occasions in an order from an M-th CMR to the first CMR.

9. The method according to claim 8, wherein the first preset rule is: IMRs corresponding to the N CMRs are in a one-to-one mapping to interference measurement resources on the latest N measurement occasions.

10. The method according to claim 2, wherein the multiple pieces of QCL information of the IMR are used in one of the following ways: using one piece of QCL information on one measurement occasion or using multiple pieces of QCL information on one measurement occasion.

11. The method according to claim 1, wherein after the determining a first channel state information CSI report, the method further comprises:
sending a second CSI report, wherein
the second CSI report comprises a first target CSI report and a second target CSI report, the first target CSI report is a target CSI report that is unselected in multiple target CSI reports in the first CSI report, and the second target CSI report is a target CSI report that is selected in the multiple target CSI reports.

12. The method according to claim 11, wherein a first part of the first target CSI report comprises at least one of the following:
a CQI index value being 0 or a first specified value;
an RI index value being 0 or a second specified value; or
a CSI state indicated by a bitmap being a first state;
and/or,
wherein a first part of the second target CSI report comprises at least one of the following:
a CQI index value being not 0 or not a first specified value;
an RI index value being not 0 or not a second specified value;
a CRI; or
a CSI state indicated by a bitmap being a second state;
and/or,
wherein the second CSI report comprises a first part of the first target CSI report and/or all parts of the second target CSI report.

13. The method according to claim 1, wherein in a case that the first CSI report corresponds to multiple CSI reporting settings, after the determining a first channel state information CSI report, the method further comprises:
sending a third CSI report for multiple times, wherein the third CSI report is determined based on a first target CSI report and a second target CSI report;
or
sending a joint CSI report, wherein the joint CSI report comprises report parameters corresponding to the second target CSI report, wherein
the first target CSI report is a target CSI report that is unselected in multiple target CSI reports in the first CSI report, and the second target CSI report is a target CSI report that is selected in the multiple target CSI reports.

14. The method according to claim 13, wherein in a case that the multiple target CSI reports correspond to different physical uplink control channel PUCCH resources or physical uplink shared channel PUSCH resources, the third CSI report is sent for multiple times; and
in a case that the multiple target CSI reports correspond to a same PUCCH resource or PUSCH resource, the joint CSI report is sent.

15. A method for determining a reporting setting, performed by a network-side device, comprising:
configuring a reporting setting, wherein the reporting setting comprises at least one of the following mappings:
a mapping between multiple groups of channel measurement resources CMRs and multiple groups of interference measurement resources IMRs; or
a mapping between multiple groups of CMRs and one group of IMRs, wherein
each group of CMRs comprises one or more CMRs, and each group of IMRs comprises one or more IMRs.

16. The method according to claim 15, wherein each of the multiple groups of CMRs corresponds to one transmission-reception point TRP or one transmission configuration indicator TCI state, and the multiple groups of CMRs have a same shift or different shifts.

17. The method according to claim 15, further comprising:
receiving a CSI report, wherein the CSI report comprises a first target CSI report unselected by a terminal and/or a second target CSI report selected by the terminal.

18. The method according to claim 17, wherein after the receiving a CSI report, the method further comprises:
skipping scheduling a TRP corresponding to the first target CSI report; or scheduling a TRP corresponding to the first target CSI report;
and/or,
wherein a first part of the first target CSI report comprises at least one of the following:
a channel quality indicator CQI index value being 0 or a first specified value;
a rank indicator RI index value being 0 or a second specified value; or
a CSI state indicated by a bitmap being a first state;
and/or,
wherein a first part of the second target CSI report comprises at least one of the following:
a channel quality indicator CQI index value being not 0 or not a first specified value;
a rank indicator RI index value being not 0 or not a second specified value;
a channel state information resource indicator CRI; or
a CSI state indicated by a bitmap being a second state.

19. A terminal, comprising a processor, a memory, and a program or instructions stored in the memory and capable of running on the processor, wherein when the program or instructions are executed by the processor, following step is implemented:
determining a first channel state information CSI report according to at least one of the following mappings:
a mapping between multiple groups of channel measurement resources CMRs and multiple groups of interference measurement resources IMRs; or
a mapping between multiple groups of CMRs and one group of IMRs, wherein
each group of CMRs comprises one or more CMRs, and each group of IMRs comprises one or more IMRs.

20. A network-side device, comprising a processor, a memory, and a program or instructions stored in the memory and capable of running on the processor, wherein when the program or instructions are executed by the processor, the steps of the method for determining a reporting setting according to claim 15 are implemented.

* * * * *